UNITED STATES PATENT OFFICE.

OLIVER C. RALSTON, OF NIAGARA FALLS, NEW YORK.

PROCESS OF TREATING BRASS SCRAP.

1,375,930.   Specification of Letters Patent.   Patented Apr. 26, 1921.

No Drawing.   Application filed January 2, 1920.   Serial No. 348,782.

*To all whom it may concern:*

Be it known that I, OLIVER C. RALSTON, a citizen of the United States, residing at Niagara Falls, in the county of Niagara and State of New York, have invented certain new and useful Improvements in Processes of Treating Brass Scrap, of which the following is a specification.

This invention is a novel process for the treatment of scrap brass and related copper-bearing alloys, the object of the invention being to effect a purification of the scrap, either with or without the coincident conversion of yellow brass into so-called red brass, or other variety relatively high in copper, or even into a residue consisting essentially of copper.

In a copending application filed December 8, 1919, by W. J. Marsh, patented Sept. 21, 1920, Patent No. 1,353,773, there is described a process involving the solution of copper-bearing alloys by reacting thereon with a solution containing cupric chlorid, the cupric chlorid content of the solution being properly maintained during the process, preferably by the introduction of chlorin, or of hydrochloric acid and oxygen.

According to the present invention the scrap brass or similar alloy is subjected to the solvent action of cupric chlorid to an extent which is limited according to the particular object in view, as hereinbelow explained, whereby certain metals which are electropositive to copper are wholly or partially eliminated, a copper bearing-residue remaining, the copper content of which is increased as compared with the original material.

The process may be carried out in various ways, and in any of its modifications, as described below, the initial aqueous solution may contain cupric chlorid, or may consist merely of water, or of a weak hydrochloric acid solution, into which gaseous chlorin is introduced. Under the last mentioned conditions the chlorin reacts with the copper component of the brass to yield a solvent liquor containing sufficient cupric chlorid for the purposes of this invention, after which the reaction proceeds as though cupric chlorid had been initially added.

*Purification of brass scrap.*

Brass scrap frequently contains in addition to the zinc and copper components material proportions of aluminum, iron and other metals which are electropositive to copper, and the presence of which reduces the commercial value of the scrap. I have discovered that such electropositive metals are preferentially removed by limited treatment with cupric chlorid in aqueous solution; and that especially in the case of brass shavings and other thin forms the purification as regards such metals may be made substantially complete, leaving a residue which, for melting purposes, possesses a decidedly higher value per unit of weight than the original impure materials.

For example I have been able in this way, starting with a brass scrap containing zinc 35% and iron 0.2%, to reduce the contents of these metals to zinc 10% and iron 0.05%, with a total loss of weight of the charge not exceeding 48%.

*Conversion of yellow brass to red brass or copper.*

In purifying yellow brass in the manner described above, some zinc of course passes into solution with the aluminum and iron. The extent of solution of the zinc is controlled and adjusted in accordance with my invention, in order to produce either a red brass residue, or a copper residue, or any intermediate composition, as may be desired.

For example inferior brass turnings containing approximately—

| | |
|---|---|
| Copper | 60% |
| Zinc | 37% |
| Lead | 2% |
| Iron | 1% | may be treated with chlorin in presence of water (or alternatively with cupric chlorid solution with introduction of chlorin) until a product remains containing approximately 80% of copper, 16% of zinc, and only very small amounts of lead, iron and other impurities. This product, which usually contains some chlorin presumably as insoluble cuprous chlorid, may be melted under a flux of lime and charcoal with very little loss of copper, and yields a good grade of red brass. Zinc, copper, alloys thereof, or other alloying elements may of course be added during the melting to give a product of any desired composition.

Instead of stopping at a composition corresponding to that of red brass as described above, the solvent treatment may be continued to dissolve most or all of the zinc, together with the bulk of the aluminum, iron and other impurities electropositive to copper. In case the reaction is carried far enough the residue will consist very largely of copper, and by melting the residue and subjecting the melt to the usual flapping and poling operations good grades of casting copper are obtained.

In connection with the foregoing processes it will be understood by those familiar with this art that much of the scrap brass produced in the brass industry is re-melted with virgin metal in sufficient quantity so that contaminations of iron, aluminum and similar metals do not spoil the product for industrial purposes. Brass turnings and borings are usually passed over a magnetic separator in order to remove iron particles or turnings before the melting operation. Nevertheless, undesirable metals accumulate and most scrap brass is worth considerably less on the market than the combined values of the contained metals.

I claim;

1. Process of treating copper-bearing alloys comprising reacting thereon with an aqueous solution containing a solvent for metals electropositive to copper, thereby progressively increasing the copper content of the undissolved residue, and arresting the reaction when the desired copper content in said residue is attained.

2. Process of purifying copper-bearing alloys from metals electropositive to copper, comprising subjecting said alloys to limited reaction with cupric chlorid in aqueous solution.

3. Process of purifying copper-bearing alloys from metals electropositive to copper, comprising subjecting said alloys to limited reaction with chlorin in presence of water.

In testimony whereof, I affix my signature.

OLIVER C. RALSTON.